United States Patent [19]

Väisänen

[11] 4,386,045
[45] May 31, 1983

[54] METHOD AND APPARATUS FOR MANUFACTURING THE SOCKET PORTION OF A PLASTIC PIPE

[75] Inventor: Voitto Väisänen, Nastola, Finland

[73] Assignee: Asko Oy, Nastola, Finland

[21] Appl. No.: 267,489

[22] Filed: May 27, 1981

[30] Foreign Application Priority Data

Mar. 23, 1981 [FI] Finland ................................. 810891

[51] Int. Cl.³ ...................... B29C 1/00; B29C 17/07; B29D 3/00
[52] U.S. Cl. .................................... 264/249; 264/296; 264/313; 264/322; 264/334; 425/509; 425/384; 425/393; 425/400; 425/407; 425/417; 425/457
[58] Field of Search ............... 264/250, 320, 322, 313, 264/334, 294, 296, 249, 230; 425/500, 502, 509, 425/383, 384, 392, 393, 400, 407, 412, 417, 457, 460

[56] References Cited

U.S. PATENT DOCUMENTS

| | | | |
|---|---|---|---|
| 3,836,622 | 9/1974 | Sporre | 264/322 |
| 3,887,992 | 6/1975 | Parmann | 264/249 |
| 3,899,565 | 8/1975 | de Putter et al. | 264/296 |
| 3,910,744 | 10/1975 | Ronden et al. | 264/322 |
| 3,929,958 | 12/1975 | Parmann | 264/249 |
| 3,942,935 | 3/1976 | Heisler | 264/322 |
| 4,030,872 | 6/1977 | Parmann | 425/393 |
| 4,034,057 | 7/1977 | Acda | 264/322 |
| 4,065,243 | 12/1977 | Acda et al. | 264/322 |
| 4,113,813 | 9/1978 | Wilson | 264/322 |
| 4,157,372 | 6/1979 | Kyomen | 264/322 |
| 4,181,698 | 1/1980 | Hayes et al. | 264/334 |
| 4,204,823 | 5/1980 | Hayes et al. | 425/403 |
| 4,231,983 | 11/1980 | French | 264/296 |
| 4,239,473 | 12/1980 | Fulhaber | 425/403 |
| 4,277,231 | 7/1981 | Gordon | 425/393 |

FOREIGN PATENT DOCUMENTS 2538278 3/1976 Fed. Rep. of Germany ...... 425/392
752458 8/1975 Finland .

Primary Examiner—Willard E. Hoag
Attorney, Agent, or Firm—Ladas & Parry

[57] ABSTRACT

A method and an apparatus for manufacturing the socket portion of a plastics pipe provided with a sealing ring by pushing said sealing ring on a mandrel and by locking it thereto whereupon the heated end of said plastics pipe is pushed onto said mandrel and said sealing ring. Hereafter, the locking of said sealing ring is released, and the pipe and the ring therein a removed from the mandrel.

In order to facilitate this removal operation, a mandrel having an adjustable diameter is used, the mantle surface of said mandrel being provided with peripheral grooves into which shoulders in said sealing ring fit for locking said ring to said mandrel for the duration of the socket forming.

3 Claims, 1 Drawing Figure

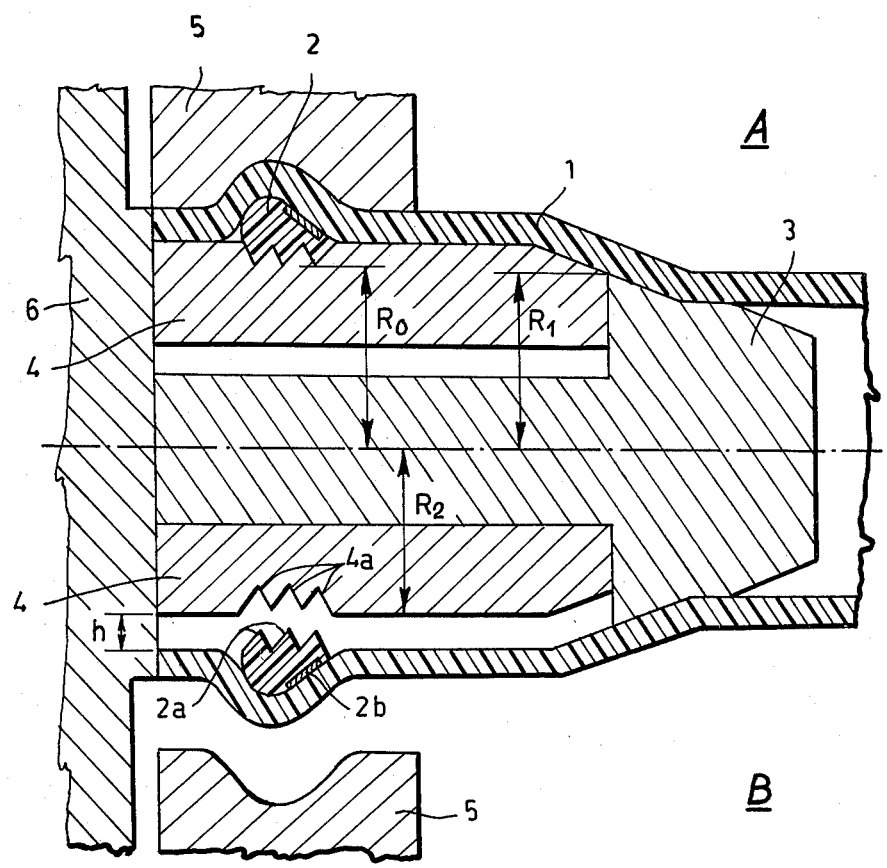

METHOD AND APPARATUS FOR MANUFACTURING THE SOCKET PORTION OF A PLASTIC PIPE

The present invention relates to a method for manufacturing the socket portion of a plastics pipe provided with an internal sealing ring containing a stiffener, according to which method said sealing ring is pushed on a mandrel and locked axially in place by means of mating lock means located in said mandrel and said sealing ring, the heated plastics pipe is pushed on said mandrel and said sealing ring as a result of a relative axial movement of said pipe and said mandrel, the locking between said sealing ring, and said mandrel is released, and the socket portion is removed from said mandrel.

Such a method is previously known from the Finnish Patent Application No. 752,458 which relates to a sealing of the so-called Rieber type. The Rieber sealing differs from other common sealings in that it is provided with a built-in stiffener which, on one hand, permits the use of the sealing as former of a sealing groove in connection with socketing and, on the other hand, locks the sealing in place in the finished pipe. The manufacturing method employing the Rieber sealing has the advantage of providing a socket pipe completely ready for use.

According to the method described in said patent application, the heated pipe end is pushed on a generally cylindrical mandrel over the sealing threaded on the mandrel and locked thereto. The locking of the sealing is accomplished with a means radially movable in the mandrel which can extend into a groove in the sealing. Hereafter, the locking of the sealing is released and the pipe end is cooled whereby it shrinks onto the mandrel and the sealing. In order that the pipe should better conform to the socket shape formed by the mandrel and the sealing, an under-pressure is applied to the pipe from the inside adjacent to the sealing.

The biggest disadvantage in this method is that the pipe, while shrinking onto the mandrel, produces a quite great holding force both at the socket itself and also at the sealing. In practise, this means that the sealing is easily broken when the pipe is pulled away or that the pipe cannot be removed from the mandrel by means of a machine whereby at least one cycle time is exceeded and the socket may also have to be broken for removing the pipe. This reduces the profitability of the socketing.

In order to prevent adhering, a somewhat conical mandrel has been used. However, because the socket in principle should be cylindrical, the conicity can be realized only according to the permitted upper and lower limits for the socket diameters, which, of course, is of assistance but not sufficient.

Also lubrication of the sealing is used which takes place before the sealing is placed on the mandrel whereby the sealing slightly lubricates also the tip of the mandrel. However, the lubrication of the sealings has been carried out manually resulting in one additional working step, and a sufficient and uniform lubrication has not been completely guaranteed. In principle, said lubrication ought to be sufficient also for the pipe installation proper. However, when considering the spaces and the milieau in which the pipes are stored and handled, it is obvious that the lubrication is more of disadvantage than of advantage because dirt, sand and dust easily adhere to the lubricated surface.

Still one disadvantage in the method is that the inner surface of the sealing must be located approximately on the same level as the inner surface of the adjacent socket parts in order to be able to remove the socket portion from the mandrel. Because of this, the sealing effect of the sealing is poor.

The object of the method and apparatus according to the present invention is to eliminate the above-mentioned disadvantages while preserving the advantages of the Rieber sealing. The characteristic features of the method according to the invention appear from the accompanying claim 1. By expanding and contracting the mandrel according to the shaping phase of the socket certain substantial advantages are achieved. The pushing of the sealing on a contracted mandrel is easier than on a fixed mandrel. This is of special importance in connection with large pipe diameters. The radial expansion of the mandrel so that the shoulders in the sealing fit into the grooves in the mandrel and the contraction of the mandrel permit the use of such shoulders in the sealing which extend considerably inside the inner surface of the socket portion. Due to this, the sealing effect of the sealing is decisively improved and wider manufacturing tolerances can be used in the socket portion. This results in a smaller loss percentage and less need for control in the manufacture. In assembling the pipe line, the pushing-in force is smaller, and the requirements imposed on the straightness of the pipe line are less strict than earlier. Because the socket portion is removed from the mandrel in the contracted state thereof, the adherence of the pipe to the mandrel causes no problems. Now plastic pipes are securely kept undamaged because broken sealings and the removal of adhering pipes by breaking are avoided;

the production is kept at the planned rate because delays caused by adhering pipes are avoided;

less personnel is required because the clearing-up of disturbances is reduced and because one working step—the lubrication of the sealings—is omitted;

a product is obtained which stays better clean during storage and transport resulting in less work for the user of the pipe.

The invention also relates to an apparatus for carrying out the method comprising a mandrel, a sealing ring pushed on said mandrel and containing a stiffener, and mating lock means in said mandrel and said sealing ring for locking said sealing ring axially in place on the mantle surface of said mandrel. The apparatus is characterized in that said lock means for said sealing ring are comprised of at least one peripheral groove in said mantle surface of said mandrel having an adjustable diameter and of a shoulder or shoulders on said sealing ring tightly fitting into said groove.

The invention will now be described in more detail by means of an embodiment illustrated in the drawing. The drawing shows a mandrel having an adjustable diameter and intended for the application of the method according to the invention. In the drawing, the part A above the centre line illustrates the situation during the socketing operation proper, the part B under the centre line the situation just before removal of a finished socket pipe.

Reference numeral 1 denotes a pipe to be socketed, numeral 2 a Rieber sealing provided with inwardly directed shoulders 2a and, for example, a metallic stiffener 2b. Numeral 3 denotes the body of a mandrel and numeral 4 two segment blocks movable in the radial direction of the mandrel. The mantle surface of all segment blocks is provided with grooves 4a into which the shoulders 2a of the sealing tightly fit when the segment blocks are located in their outer position. Numeral 5 denotes two external jaws and numeral 6 a tool body.

In the drawing, the mechanisms of the mandrel having an adjustable diameter are not shown because their construction is not essential to the invention. Also other unessential components and details have been omitted from the drawing.

Following steps are required for carrying out the method:

1. The end of the pipe 1 is heated in a heating station. This can take place by any method.

2. At the same time, the sealing 2 is pushed on the mandrel while it is contracted, position B. The pushing is best carried out by means of a special sealing pusher means, not shown in the drawing.

3. When the sealing 2 is axially in the correct location, the relative movement of the mandrel and the sealing pushing means is stopped and the mandrel is expanded to position A. At this stage, the shoulders 2a in the sealing 2 are inserted in the grooves 4a of the mandrel.

4. The sealing pushing means is removed from the mandrel and returned to its original position.

5. The heated pipe is transferred from the heating station to a socketing station.

6. By means of a relative movement of the pipe and the mandrel the pipe is pushed on to the mandrel.

7. When the pushing is continued, the pipe 1 is lifted onto the sealing 3. The built-in support body 2b of the sealing prevents rotation of the sealing 2. In addition to applying a considerably great axial force to the sealing 2, the pipe 1 also produces a radial force due to the stretching of the diameter of the pipe 1. This radial force and the location of the shoulders 2a in the grooves 4a keep the sealing in place.

8. The pushing is continued until the end of the pipe 1 is sufficiently far in side, close to the tool body 6.

9. After the pushing has stopped, the external jaws 5 are closed resulting in the final shaping of the pipe 1 around the sealing 2.

10. The pipe 1 is allowed to cool until it has reached its rigidity.

11. The external jaws 5 are opened and the segments 4 in the mandrel are contracted.

12. By means of a relative axial movement of the mandrel 3 and the pipe 1 the pipe is removed from the mandrel.

13. The finished pipe 1 is removed from the socketing station for packing.

14. A new sealing 2 is pushed on the mandrel, as described under point 2.

15. The heating of a new pipe has been going on nearly from the moment when the preceding pipe was removed from the heating station.

The operation is continued in the above-described order.

The construction of the apparatus for carrying out the method can be described as follows.

The construction according to the drawing is only one among many possibilities. It can be noted that the movement of the segment blocks 4 is relatively small as compared to the movement required when making a normal socket groove. This facilitates the planning of the displacement mechanism for the blocks 4. The blocks 4 must be given a sufficient length so that the measure R1 does not much exceed the measure R0. In this way the sealing 2 can be pushed undamaged over the edge of the mandrel body 3. The measures R1 and R2 are approximately the same.

In the FIGURE the number of the shoulders 2a in the sealing and of the grooves 4a in the mandrel, respectively, is three. The number is unessential and can be any suitable number. But it is important that the shoulders 2a and the grooves 4a in shape correspond to each other as exactly as possible so that air gaps shall not permit elastic displacement of the sealing 2.

The contracting mandrel can be of any construction known per se or of any otherwise suitable construction. Very common is a construction in which every second segment 4 is converging towards the surface of the mandrel, every second segment towards the centre of the mandrel. Several different drive mechanisms for this construction are to be found in literature. In this case the number of the segments 4 can be any even number, however, at least four.

The number of the external jaws 5 is at least two. They ought to be shaped so as not to apply excessive pressure to the apex of the mandrel groove.

In order to shorten the cycle time, the mandrel body 3, the segment blocks 4 and the external jaws 5 can be provided with cooling, preferably with circulation water cooling.

What I claim is:

1. A method for forming an annular groove in the socket portion of a plastic pipe and installing a seal ring in the annular groove, comprising: Pushing a sealing ring onto an expandible mandrel while it is radially retracted, pushing a plastic pipe in a heat softened condition onto the mandrel and over said sealing ring by relative axial movement of said pipe and said mandrel and locking said ring onto said mandrel by at least one groove of said ring engaging a mating at least one peripheral projection of said mandrel, locking being accomplished by expanding said mandrel into said seal ring, pressing the periphery of said pipe between shaping jaws, cooling said pipe and releasing said pipe and said seal ring from said mandrel by radially retracting said mandrel.

2. An apparatus for making the socket portion of a plastic pipe provided with an internal sealing ring containing a stiffener comprising a mandrel, a sealing ring pushed on said mandrel containing a stiffener, and mating lock means in said mandrel and said sealing ring for locking said sealing ring axially in place on the mantle surface of said mandrel, said lock means for said sealing ring being comprised of at least one peripheral groove in said mantle surface of said mandrel having an adjustable diameter and of at least one peripheral ridge on said sealing ring tightly fitting into said at least one groove.

3. Apparatus as claimed in claim 2, wherein each said groove and said ridge in cross-section corresponds approximately to an isosceles triangle.

* * * * *